US012478991B2

(12) United States Patent
Kikuchi et al.

(10) Patent No.: US 12,478,991 B2
(45) Date of Patent: Nov. 25, 2025

(54) ROTARY ATOMIZING COATING DEVICE THAT INCLUDES A PLURALITY OF THROUGH HOLES THAT EXTEND IN A RADIAL DIRECTION IN A SIDE SURFACE PORTION OF THE ROTARY ATOMIZING COATING DEVICE

(71) Applicant: HONDA MOTOR CO., LTD., Tokyo (JP)

(72) Inventors: Takashi Kikuchi, Tokyo (JP); Osamu Yashima, Tokyo (JP); Takumi Hasegawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 625 days.

(21) Appl. No.: 17/949,247

(22) Filed: Sep. 21, 2022

(65) Prior Publication Data

US 2023/0097329 A1 Mar. 30, 2023

(30) Foreign Application Priority Data

Sep. 29, 2021 (JP) ................................ 2021-159557

(51) Int. Cl.
*B05B 3/10* (2006.01)

(52) U.S. Cl.
CPC .................................. *B05B 3/1014* (2013.01)

(58) Field of Classification Search
CPC .................................................... B05B 5/0407
USPC .................................................. 239/700, 703
See application file for complete search history.

(56) References Cited

U.S. PATENT DOCUMENTS 4,148,932 A * 4/1979 Tada ..................... B05B 5/0407 239/3
4,458,844 A * 7/1984 Mitsui ................... B05B 5/0407 239/222.11
5,078,321 A * 1/1992 Davis .................... B05B 3/1064 239/224

(Continued)

FOREIGN PATENT DOCUMENTS

CN 1057410 1/1992
CN 101107078 1/2008

(Continued)

OTHER PUBLICATIONS

Japanese Office Action for Japanese Patent Application No. 2021-159557 dated Jul. 4, 2023.

(Continued)

*Primary Examiner* — Karl Kurple
(74) *Attorney, Agent, or Firm* — Amin, Turocy & Watson, LLP

(57) ABSTRACT

A rotary atomizing coating device includes a main body including a rotary drive unit, and a bell cup attached to the rotary drive unit. The bell cup includes: a side surface portion extending toward a distal end in an axial direction of the rotary drive unit; a through hole configured to allow an inner surface and an outer surface of the side surface portion to communicate with each other and also configured to eject a coating material therethrough; and an outward protruding portion that is formed closer to the distal end in the axial (Continued)

direction than the through hole and protrudes more outward in a radial direction of an axis of the rotary drive unit than the side surface portion.

5 Claims, 10 Drawing Sheets

(56) References Cited

U.S. PATENT DOCUMENTS

| | | | | | |
|---|---|---|---|---|---|
| 5,752,657 | A * | 5/1998 | Hogan | B05B 3/1021 | 239/223 |
| 6,056,215 | A * | 5/2000 | Hansinger | B05B 5/10 | 239/704 |
| 6,230,993 | B1 * | 5/2001 | Austin | B05B 5/0407 | 239/708 |
| 6,886,721 | B2 * | 5/2005 | Zubeck | F16J 15/108 | 222/522 |
| 8,851,399 | B2 * | 10/2014 | Ballu | B05B 3/1014 | 239/700 |
| 9,233,381 | B2 * | 1/2016 | Motozaki | B05B 5/0403 | |
| 9,261,232 | B2 * | 2/2016 | Belik | F16N 13/16 | |
| 10,343,178 | B2 * | 7/2019 | Kishimoto | B05B 3/1014 | |
| 2002/0043571 | A1 * | 4/2002 | Nowotny | B05B 3/1021 | 239/225.1 |
| 2010/0155504 | A1 * | 6/2010 | Yamasaki | B05B 3/1064 | 239/214 |
| 2010/0193604 | A1 * | 8/2010 | Ballu | B05B 3/1014 | 239/548 |
| 2018/0221896 | A1 * | 8/2018 | Yamada | B05B 5/0407 | |

FOREIGN PATENT DOCUMENTS

| | | |
|---|---|---|
| CN | 212702511 | 3/2021 |
| EP | 0878238 | 11/1998 |
| JP | 63-090449 | 6/1988 |
| JP | 08-033859 | 2/1996 |
| JP | 10-216567 | 8/1998 |
| JP | 10-305241 | 11/1998 |
| JP | 2001-046927 | 2/2001 |
| JP | 2006-181556 | 7/2006 |
| JP | 2013-000611 | 1/2013 |
| KR | 810000316 | 4/1981 |
| WO | 2006/023033 | 3/2006 |

OTHER PUBLICATIONS

Chinese Office Action and Search Report for Chinese Patent Application No. 202211199922.0 dated Sep. 17, 2025.

* cited by examiner

ROTARY ATOMIZING COATING DEVICE THAT INCLUDES A PLURALITY OF THROUGH HOLES THAT EXTEND IN A RADIAL DIRECTION IN A SIDE SURFACE PORTION OF THE ROTARY ATOMIZING COATING DEVICE

CROSS-REFERENCE TO RELATED APPLICATIONS

This application is based upon and claims the benefit of priority from Japanese Patent Application No. 2021-159557 filed on Sep. 29, 2021, the contents of which are incorporated herein by reference.

BACKGROUND OF THE INVENTION

Field of the Invention

The present invention relates to a rotary atomizing coating device.

Description of the Related Art

A rotary atomizing coating device is a device which performs coating by ejecting a coating material (paint) from a rotating bell cup to the outside by centrifugal force. The bell cup is attached to a rotary drive unit. The bell cup is rotated by the rotary drive unit to eject the coating material to the outside. The bell cup has a cylindrical side surface portion whose peripheral wall extends along the axis of the bell cup. The side surface portion of the bell cup has a plurality of through holes penetrating from the inner surface to the outer surface (see, for example, JP 2001-046927 A).

In the rotary atomizing coating device, a coating material is ejected to the outside of the bell cup through the plurality of through holes formed in the side surface portion of the bell cup. The through holes restrict passage of the coating material. Thus, the rotary atomizing coating device limits the particle diameter of the ejected coating material to be smaller than the hole diameter of the through holes.

SUMMARY OF THE INVENTION

In the conventional art described above, the particles of the coating material are ejected radially outward of the axis by centrifugal force. However, a surface to be coated is located at a position facing the distal end of the bell cup. Therefore, in the conventional art, since the particles of the coating material cannot be ejected toward the surface to be coated, the coating pattern spreads out over a large area.

Shaping air, which flows toward the surface to be coated, can be used to prevent spreading of the coating pattern. However, the shaping air reduces the coating efficiency of the coating material onto the surface to be coated.

It is an object of the present invention to solve the above problems.

According to an aspect of the present disclosure, there is provided a rotary atomizing coating device including a main body including a rotary drive unit, and a bell cup attached to the rotary drive unit, wherein the bell cup includes: a side surface portion extending toward a distal end in an axial direction of the rotary drive unit; a through hole configured to allow an inner surface and an outer surface of the side surface portion to communicate with each other and also configured to eject a coating material therethrough; and an outward protruding portion that is formed closer to the distal end in the axial direction than the through hole and protrudes more outward in a radial direction of an axis of the rotary drive unit than the side surface portion.

The rotary atomizing coating device according to the above aspect can discharge the particles of the coating material toward the front of the bell cup without using shaping air.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

First Embodiment

Figure 1:
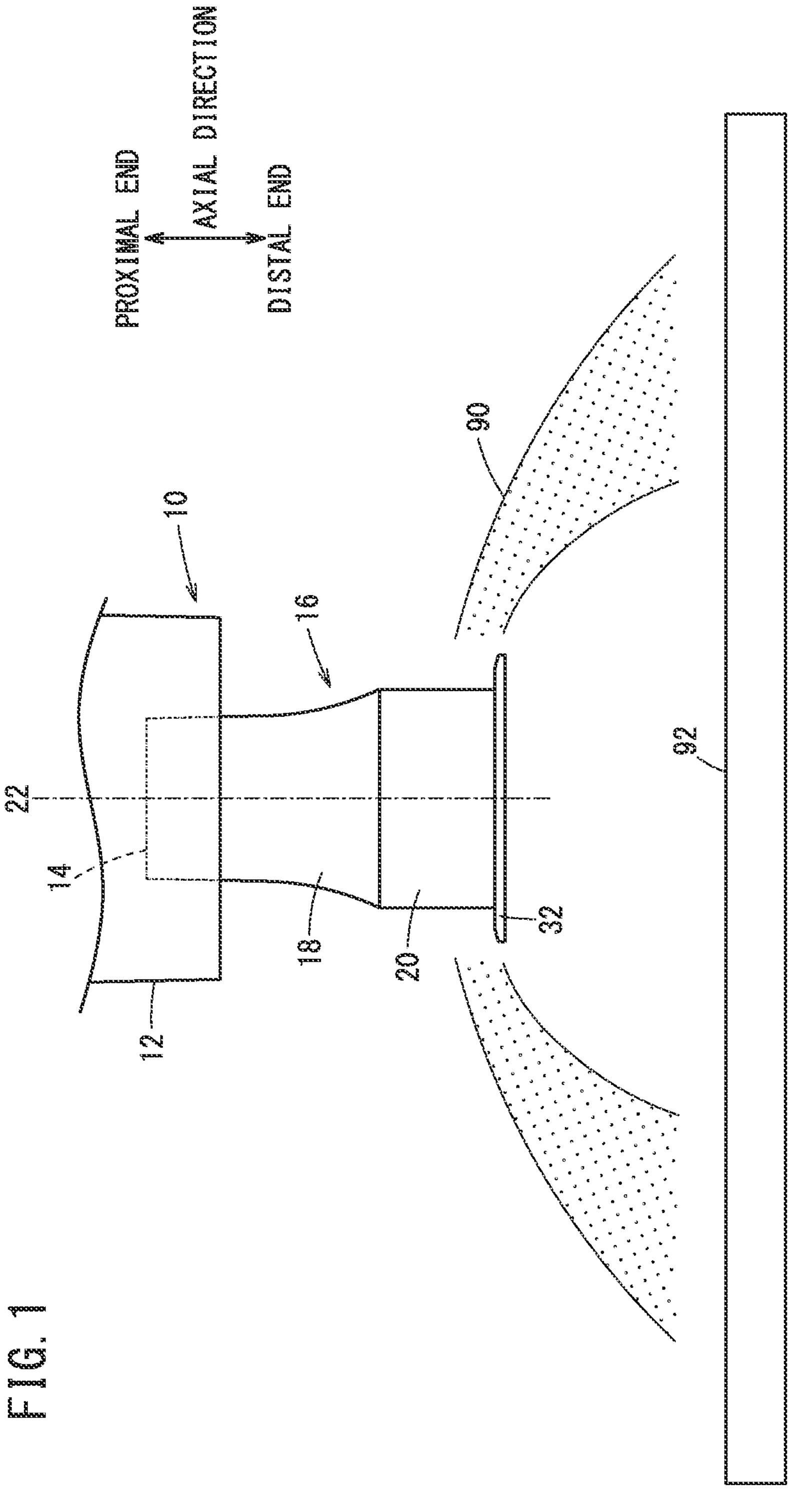
FIG. 1 is an explanatory view showing coating by a rotary atomizing coating device according to an embodiment of the present invention.

As shown in FIG. 1, a rotary atomizing coating device 10 according to the present embodiment coats a target object 92 with an atomized coating material (atomized paint) 90. The rotary atomizing coating device 10 includes a main body 12, a rotary drive unit 14, and a bell cup 16. The main body 12 supplies a coating material 90 to the bell cup 16. The main body 12 supports the bell cup 16 via the rotary drive unit 14. The rotary drive unit 14 includes a motor. The rotary drive unit 14 rotatably supports the bell cup 16 via the motor.

The bell cup 16 ejects the coating material 90 in an atomized form radially outward from an axis 22, which is the center of rotation, by centrifugal force generated by the rotation. The atomized coating material 90 ejected from the bell cup 16 is electrically charged. The electrically-charged atomized coating material 90 is attracted to the target object 92 by electrostatic force and is then applied thereto.

Figure 2:
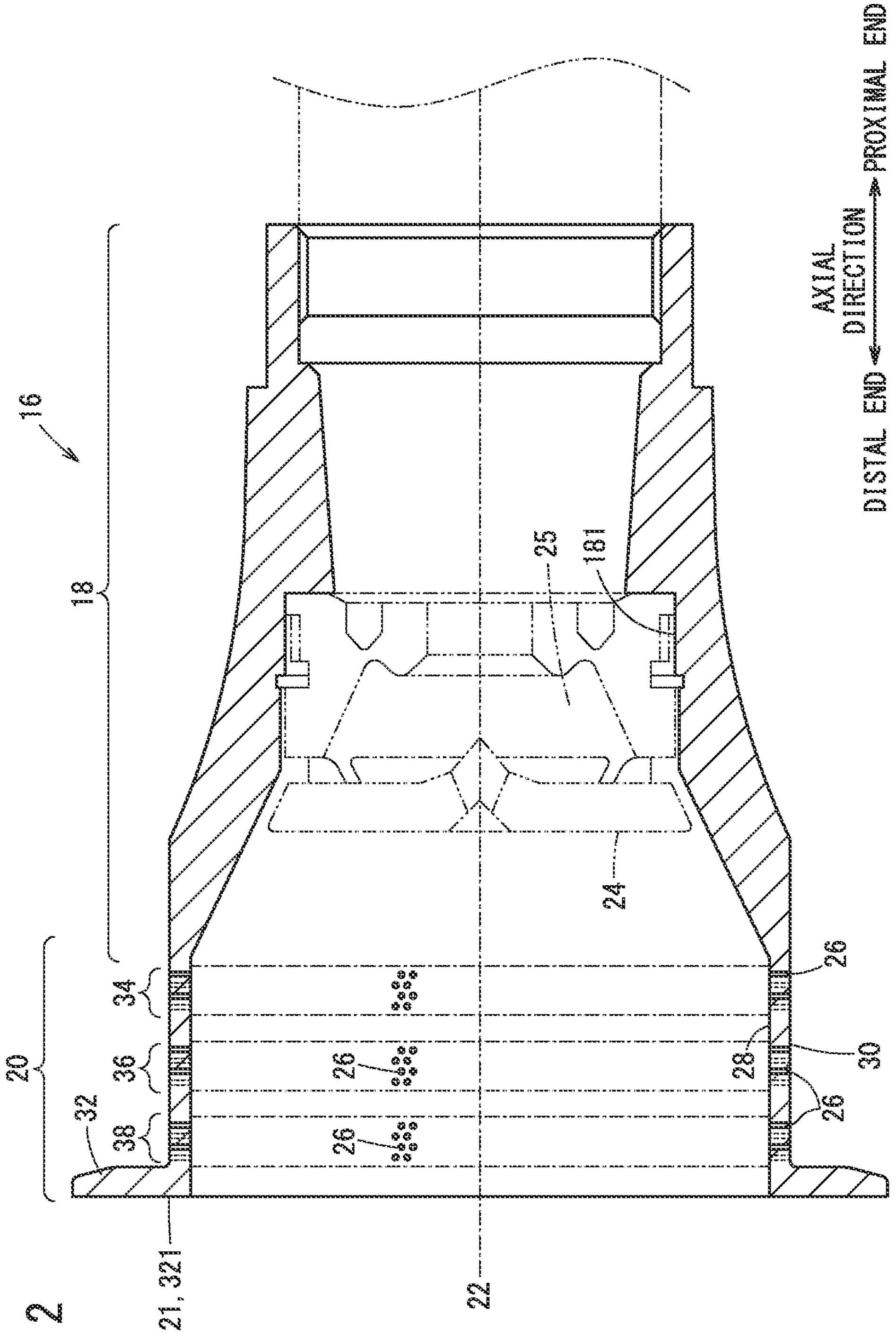
FIG. 2 is a partially enlarged cross-sectional view of a side surface portion of a bell cup of the rotary atomizing coating device according to a first embodiment.

As shown in FIG. 2, the bell cup 16 includes a bell cup body 18 and a side surface portion 20. The bell cup body 18 is located at the proximal end of the side surface portion 20. The proximal end of the bell cup body 18 is connected to the rotary drive unit 14. The bell cup body 18 has a bell shape whose diameter gradually increases in a direction toward the distal end, which is a direction to separate away from the rotary drive unit 14. The center of the bell cup body 18 and the side surface portion 20 coincides with an axis 22 which is the center of rotation of the rotary drive unit 14. The bell cup body 18 has a hollow portion 181 therein. A closing portion 24 is disposed in the hollow portion 181 of the bell cup body 18. The closing portion 24 is connected to the rotary drive unit 14. The closing portion 24 has an atomization chamber 25 on the proximal end side. The atomization chamber 25 is an empty chamber that applies centrifugal force to the coating material 90.

Figure 3A:
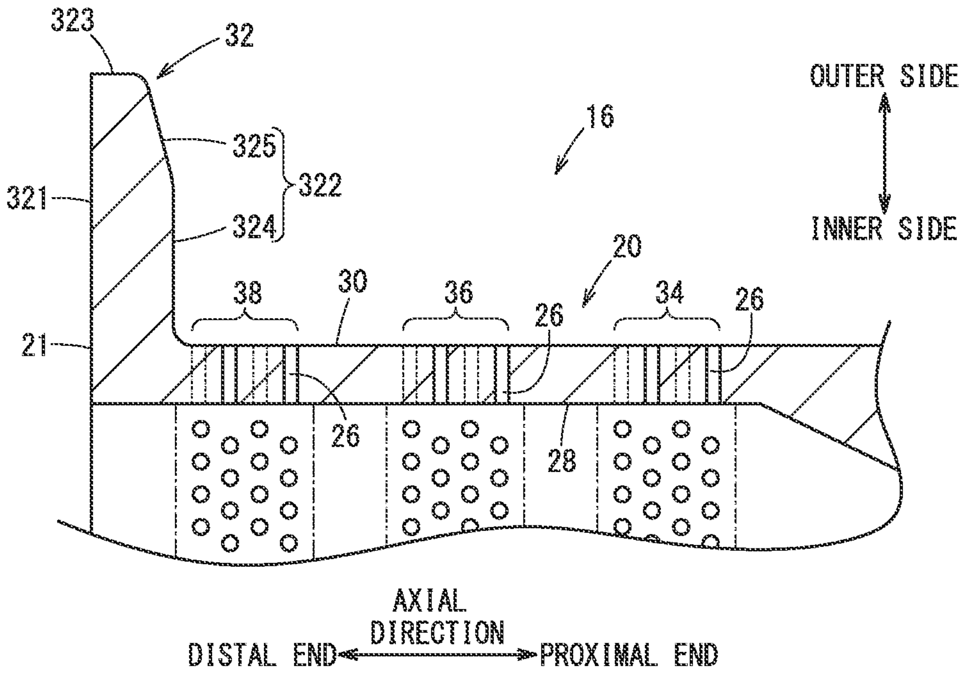
FIG. 3A is an enlarged cross-sectional view of the distal end and its vicinity of the bell cup of FIG. 2.

The side surface portion 20 extends from the bell cup body 18 in a direction away from the rotary drive unit 14. The side surface portion 20 has a cylindrical shape whose center is aligned with the axis 22. As shown in FIG. 3A, the side surface portion 20 includes a plurality of through holes 26. Each through hole 26 has a circular or rectangular cross-sectional shape. The through holes 26 penetrate the side surface portion 20 in the radial direction to thereby cause an inner surface 28 of the side surface portion 20 to communicate with an outer surface 30 thereof. The coating material 90 supplied to the inner surface 28 of the side surface portion 20 is ejected outward from the through hole 26. The side surface portion 20 may extend obliquely with respect to the axis 22. In this case, an outer end surface 323 of the outward protruding portion 32, which will be described later, is formed so as to protrude further outward than a portion having the largest diameter in the side surface portion 20.

Figure 3B:
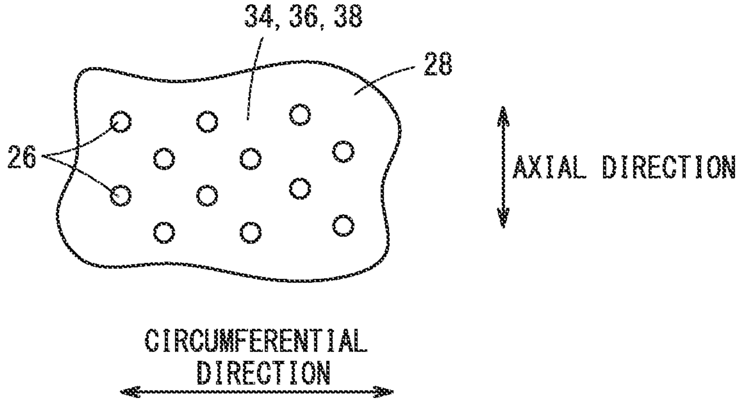
FIG. 3B is a partially enlarged view showing an arrangement pattern of through holes of the bell cup of FIG. 2.

The plurality of through holes 26 are arranged in belt-shaped regions 34, 36, 38 extending in the circumferential direction of the side surface portion 20. As shown in FIG. 3B, in each of the belt-shaped regions 34, 36, and 38, the plurality of through holes 26 are arranged in a staggered pattern. That is, the adjacent through holes 26 are arranged to be shifted from each other in the circumferential direction and in the direction of the axis 22. The staggered arrangement pattern of the through holes 26 prevents the particles of the ejected coating material 90 from colliding with each other and prevents the occurrence of uneven coating. The side surface portion 20 may not include the belt-shaped regions 34, 36, and 38. In this case, the through holes 26 are arranged in a wider area of the side surface portion 20.

As shown in FIGS. 2 and 3A, the side surface portion 20 has an outward protruding portion 32 at the edge of the distal end. The outward protruding portion 32 extends outward in a plate shape from the side surface portion 20. The outward protruding portion 32 extends over the entire circumference of the outer surface 30 of the side surface portion 20. The outward protruding portion 32 has a circular flange shape.

Figure 4:
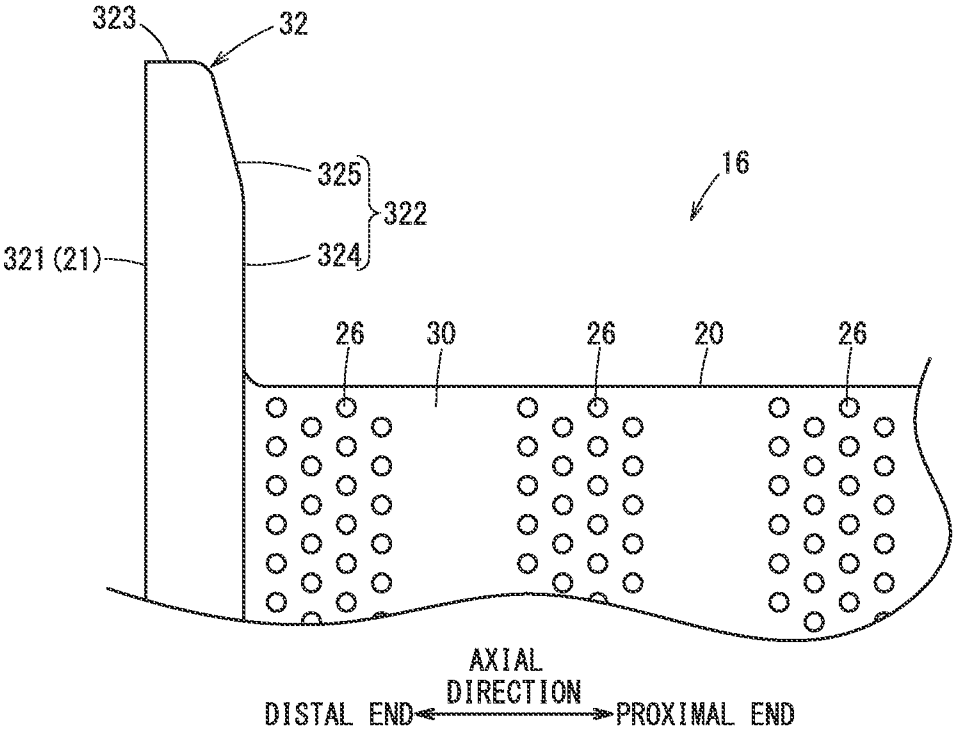
FIG. 4 is a partially enlarged view of an outward protruding portion of the bell cup of FIG. 2.

As shown in FIG. 4, the outward protruding portion 32 includes a distal end surface 321, a proximal end surface 322, and an outer end surface 323. The distal end surface 321 is located at a distal end of the outward protruding portion 32. The distal end surface 321 is a flat surface orthogonal to the axis 22. The distal end surface 321 forms the same plane as the distal end surface 21 of the side surface portion 20. The outer end surface 323 is located at an outer peripheral edge of the outward protruding portion 32. The proximal end surface 322 is located at a proximal end of the outward protruding portion 32. The proximal end surface 322 includes an inner peripheral portion 324 parallel to the distal end surface 321 and an outer peripheral portion 325 formed on the outer periphery of the inner peripheral portion 324. The outer peripheral portion 325 is inclined so as to become closer to the distal end surface 321 toward the outer periphery. Note that the proximal end surface 322 may be a curved surface smoothly and continuously extending over the inner peripheral portion 324 and the outer peripheral portion 325.

A boundary between the side surface portion 20 and the proximal end surface 322, a boundary between the proximal end surface 322 and the outer end surface 323, and a boundary between the outer end surface 323 and the distal end surface 321 are connected by smoothly curved surfaces.

The rotary atomizing coating device 10 of the present embodiment is configured as described above, and the operation thereof will be described below.

As shown in FIG. 1, the rotary atomizing coating device 10 is used in a state in which the bell cup 16 is rotated by the rotary drive unit 14. The coating material 90 is supplied to the rotating bell cup 16. The coating material 90 flows along the inner surface 28 of the bell cup 16 due to centrifugal force. The coating material 90 flows to the side surface portion 20 along the inclination of the bell cup body 18. The coating material 90 flows outward through the through holes 26 of the side surface portion 20, and is sprayed outward in the radial direction of the axis 22 in a mist form. The atomized coating material 90 flows along the airflow around the bell cup 16.

Figure 6:
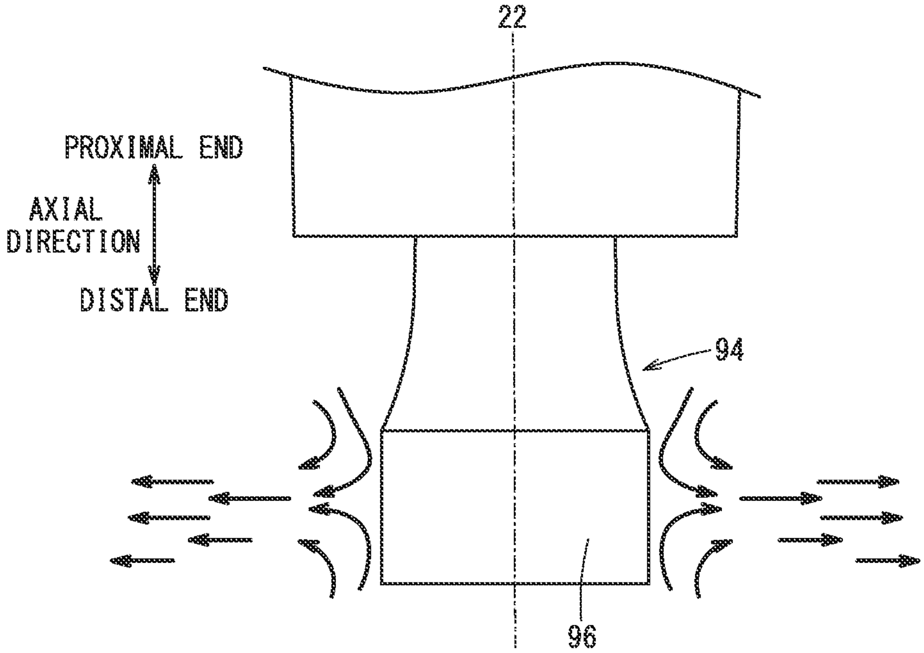
FIG. 6 is an explanatory view showing the flow of air outside a bell cup according to a comparative example.

A bell cup 94 of a comparative example shown in FIG. 6 has a side surface portion 96. The side surface portion 96 does not have the outward protruding portion 32. The rotating bell cup 94 generates an airflow from the proximal end to the distal end of the side surface portion 96 and an airflow from the distal end to the proximal end of the side surface portion 96. The two airflows collide with each other near the center of the side surface portion 96 in the direction of the axis 22, and generate an airflow directed outward in the radial direction of the side surface portion 96. The airflow outside the side surface portion 96 is directed only outward in the radial direction and is not directed toward the distal end. For this reason, in the bell cup 94 of the comparative example, the atomized coating material 90 joins the airflow heading outward of the side surface portion 96, and is then jetted outward in the radial direction.

Figure 5:
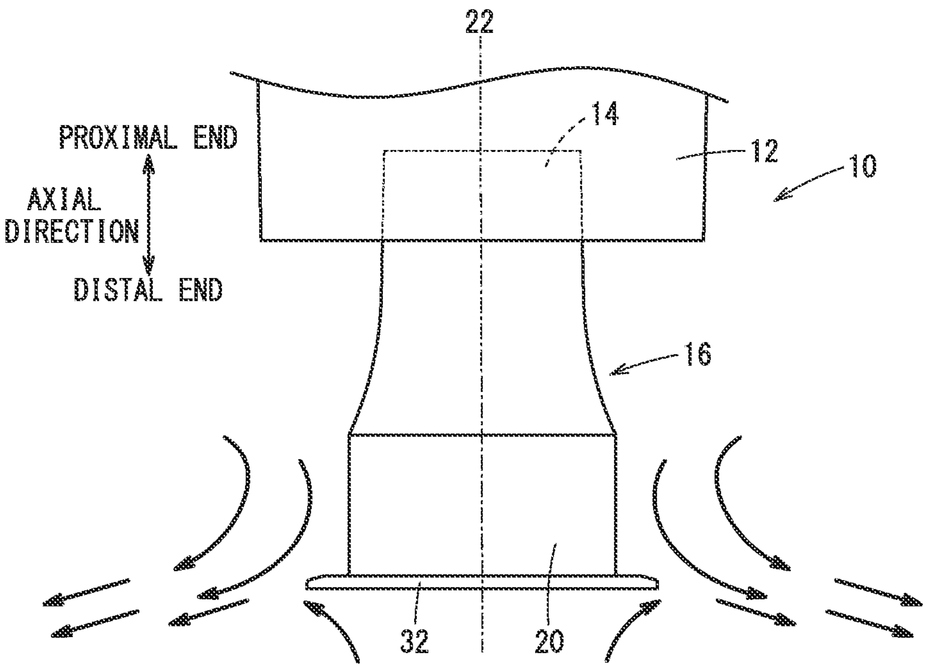
FIG. 5 is an explanatory view showing the flow of air outside the bell cup of FIG. 2.

On the other hand, as shown in FIG. 5, the bell cup 16 of the present embodiment can generate an airflow toward the distal end by the action of the outward protruding portion 32 of the side surface portion 20. That is, the outward protruding portion 32 of the side surface portion 20 protrudes further outward than the outer surface 30. Therefore, the circumferential speed in the outward protruding portion 32 is higher than the circumferential speed in the outer surface 30. The distribution of the flow velocity of the airflow around the bell cup 16 has the maximum at the tip of the outward protruding portion 32. As the flow velocity of the airflow increases, the pressure decreases around the outward protruding portion 32. Therefore, the air around the bell cup 16 flows toward the distal end of the bell cup 16. As a result, as shown in the drawing, the bell cup 16 generates a flow of air toward the distal end on the outer side of the side surface portion 20. This flow of air toward the distal end directs the spraying direction of the atomized coating material 90 toward the target object 92 (see FIG. 1). Therefore, the rotary atomizing coating device 10 of the present embodiment can spray the coating material 90 toward the distal end. In addition, the rotary atomizing coating device 10 can reduce the diameter of the coating pattern.

Second Embodiment

Figure 7:
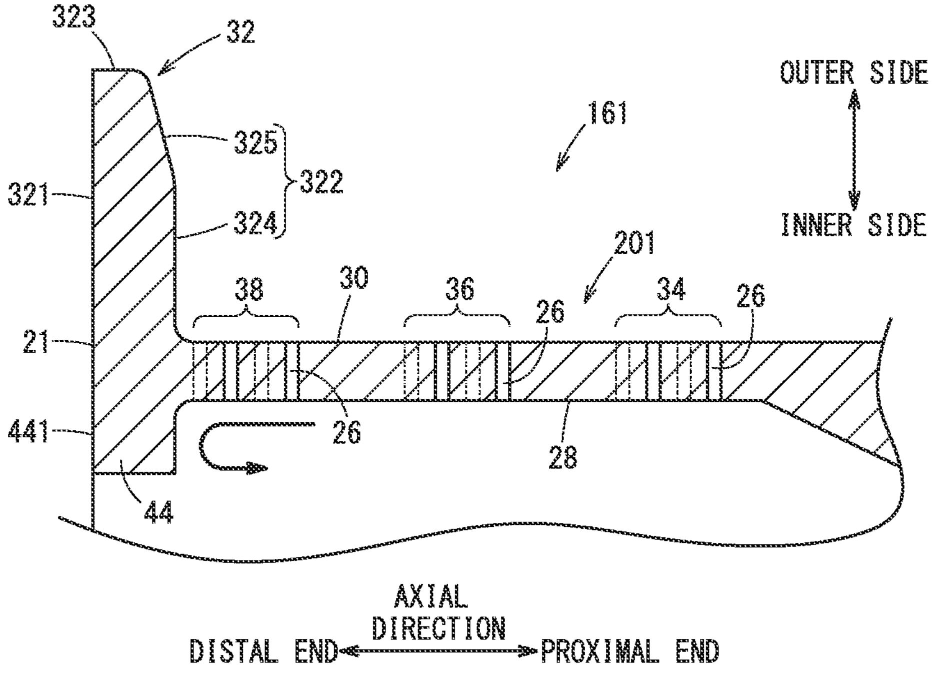
FIG. 7 is an enlarged cross-sectional view of the distal end and its vicinity of a bell cup according to a second embodiment.

As shown in FIG. 7, a bell cup 161 of the present embodiment differs from the bell cup 16 described with reference to FIGS. 1 to 4 in a side surface portion 201. In the bell cup 161 of FIG. 7, the same components as those of the bell cup 16 described with reference to FIGS. 1 to 4 are denoted by the same reference numerals, and a detailed description thereof will be omitted.

As shown in FIG. 7, the side surface portion 201 of the present embodiment has an inward protruding portion 44 on the inner surface 28. The inward protruding portion 44 is arranged closer to the distal end than the belt-shaped regions 34, 36, 38 in which the plurality of through holes 26 are formed. The inward protruding portion 44 is located at a distal end of the inner surface 28. A distal end surface 441 of the inward protruding portion 44 forms the same surface as the distal end surface 21 of the side surface portion 201. As shown, the inward protruding portion 44 protrudes from the inner surface 28 toward the axis 22. The inward protruding portion 44 extends over the entire circumference of the inner surface 28 and is formed in an annular shape.

As described above, the bell cup 161 of the present embodiment has the inward protruding portion 44. When the supply amount of the coating material 90 supplied to the side surface portion 20 is increased, the inward protruding portion 44 serves as a dam that prevents the coating material 90 from flowing out. Therefore, the bell cup 161 prevents the coating material 90 from being ejected from the distal end of the bell cup 161.

Third Embodiment

Figure 8:
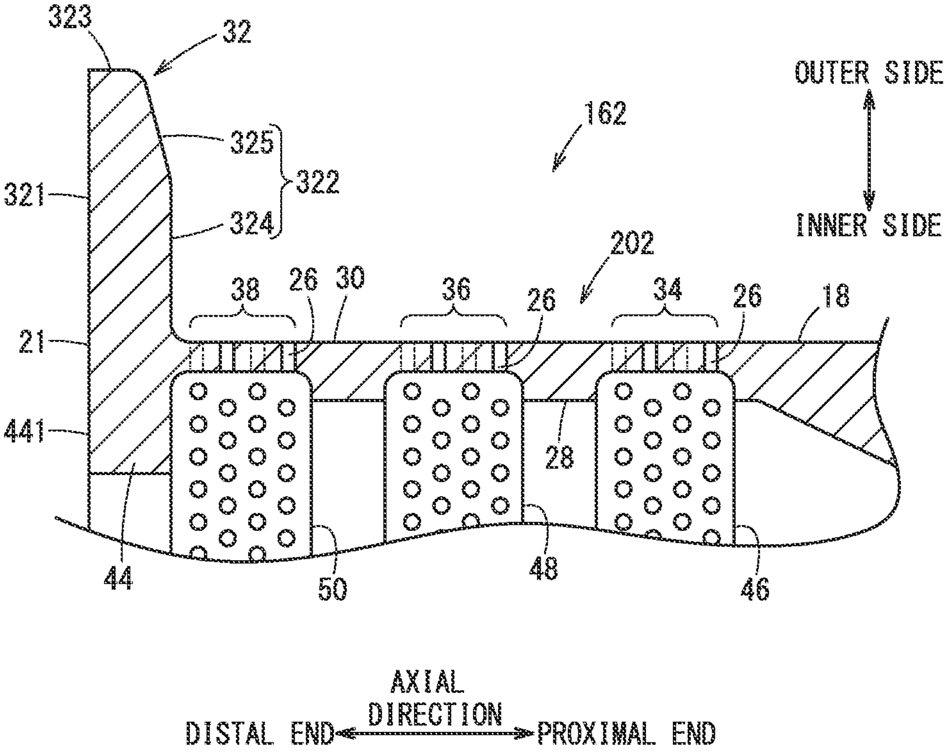
FIG. 8 is an enlarged cross-sectional view of the distal end and its vicinity of a bell cup according to a third embodiment.

As shown in FIG. 8, a bell cup 162 of the present embodiment differs from the bell cup 161 described with reference to FIG. 7 in a side surface portion 202. In the bell cup 162 of FIG. 8, components similar to those of the bell cup 161 described with reference to FIG. 7 are denoted by the same reference numerals, and detailed description thereof will be omitted.

As shown in FIG. 8, the bell cup 162 of the present embodiment has a first groove portion 46, a second groove portion 48, and a third groove portion 50, on the inner surface 28 of the side surface portion 202. The first groove portion 46 is formed along the belt-shaped region 34 located the closest to the bell cup body 18. The first groove portion 46 is formed in a groove shape recessed from the inner surface 28 toward the outer surface 30. The first groove portion 46 extends annularly over the entire circumference of the inner surface 28. The plurality of through holes 26 included in the belt-shaped region 34 open inside the first groove portion 46.

The second groove portion 48 is an annular groove formed along the belt-shaped region 36. The second groove portion 48 has the same width (dimension in the direction of the axis 22) and the same depth as the first groove portion 46. The plurality of through holes 26 included in the belt-shaped region 36 are opened in the second groove portion 48.

The third groove portion 50 is an annular groove formed along the belt-shaped region 38 located the closest to the distal end. The third groove portion 50 has the same width and the same depth as the first groove portion 46. In the third groove portion 50, the plurality of through holes 26 included in the belt-shaped region 38 are opened.

As described above, the bell cup 162 of the present embodiment includes the first groove portion 46, the second groove portion 48, and the third groove portion 50. The coating material 90 supplied from the bell cup body 18 first flows into the first groove portion 46. The coating material 90 that has flowed into the first groove portion 46 is ejected to the outside of the side surface portion 20 through the through holes 26 that are opened in the first groove portion 46. When the flow rate of the coating material 90 increases, part of the coating material 90 flows over the first groove portion 46 and into the second groove portion 48. The coating material 90 that has flowed into the second groove portion 48 is ejected to the outside of the side surface portion 20 through the through holes 26 that are opened in the second groove portion 48.

When the flow rate of the coating material 90 further increases, part of the coating material 90 flows over the second groove portion 48 into the third groove portion 50. The coating material 90 that has flowed into the third groove portion 50 is ejected to the outside of the side surface portion 20 through the through holes 26 that are opened in the third groove portion 50. Thus, the bell cup 162 stabilizes the particle diameter of the ejected coating material 90 even when the flow rate of the coating material 90 changes.

Fourth Embodiment

Figure 9A:
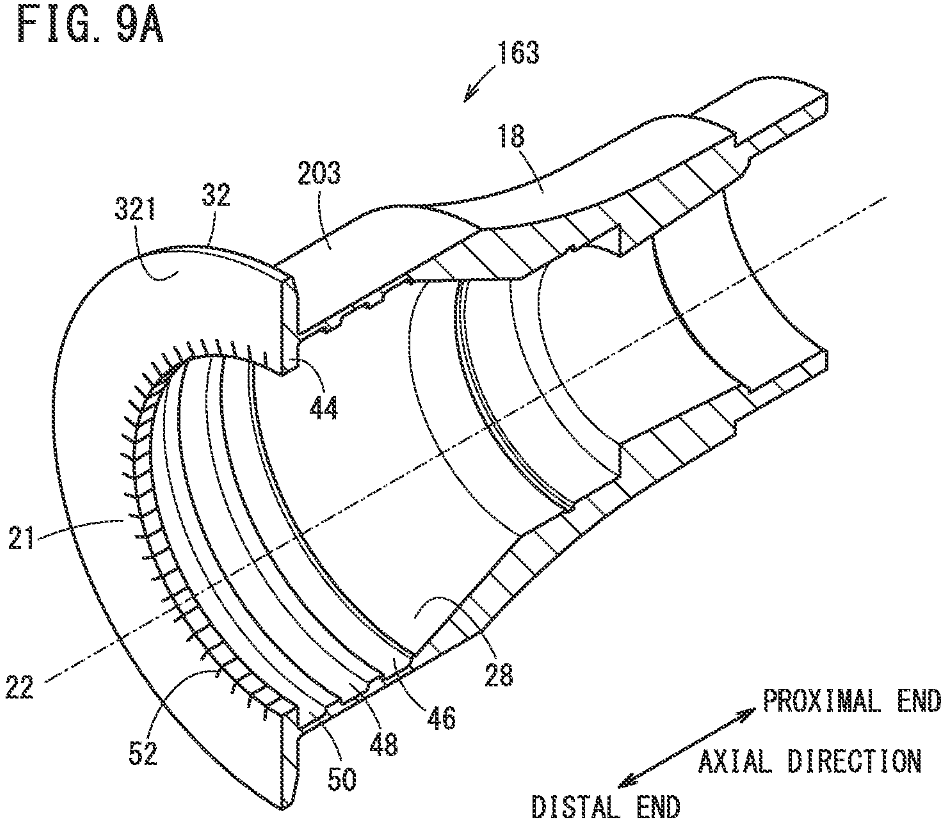
FIG. 9A is a perspective cross-sectional view of a bell cup according to a fourth embodiment.

As shown in FIG. 9A, a bell cup 163 of the present embodiment differs from the bell cup 162 described with reference to FIG. 8 in a side surface portion 203. In the bell cup 163 in FIG. 9A, the same components as those of the bell cup 162 described with reference to FIG. 8 are denoted by the same reference numerals, and detailed description thereof is omitted.

Figure 9B:
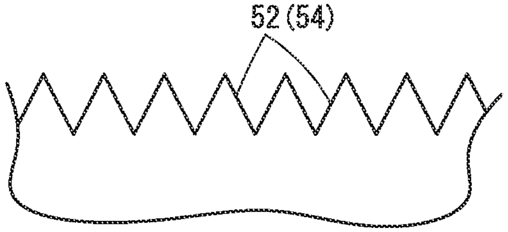
FIG. 9B is an enlarged cross-sectional view of first notched portions of FIG. 9A.

The bell cup 163 of the present embodiment has a plurality of first notched portions 52 at the distal end of the inner surface 28 of the side surface portion 203 and in the vicinity thereof. The first notched portion 52 is a groove extending in the direction of the axis 22. The first notched portion 52 is formed between the third groove portion 50 and the distal end of the side surface portion 203. The plurality of first notched portions 52 are arranged over the entire circumference of the inner surface 28 so as to be spaced at minute intervals in the circumferential direction of the inner surface 28. When the inward protruding portion 44 is provided, the first notched portions 52 are formed in the inside of the inward protruding portion 44. As shown in FIG. 9B, each first notched portion 52 has a V-shaped cross section.

The coating material 90 passes through the first notched portions 52 when flowing over the third groove portion 50 to the distal end of the bell cup 163. The coating material 90 is distributed to the fine channels of the first notched portions 52 by surface tension. The coating material 90 is ejected from the distal end of the bell cup 163 through the first notched portions 52. The first notched portions 52 stabilize the particle diameter of the coating material 90 ejected from the distal end of the bell cup 163 by making the flow rate and shape of the coating material 90 constant. Therefore, the bell cup 163 improves the coating quality by making the particle size of the coating material 90 uniform.

Fifth Embodiment

Figure 10:
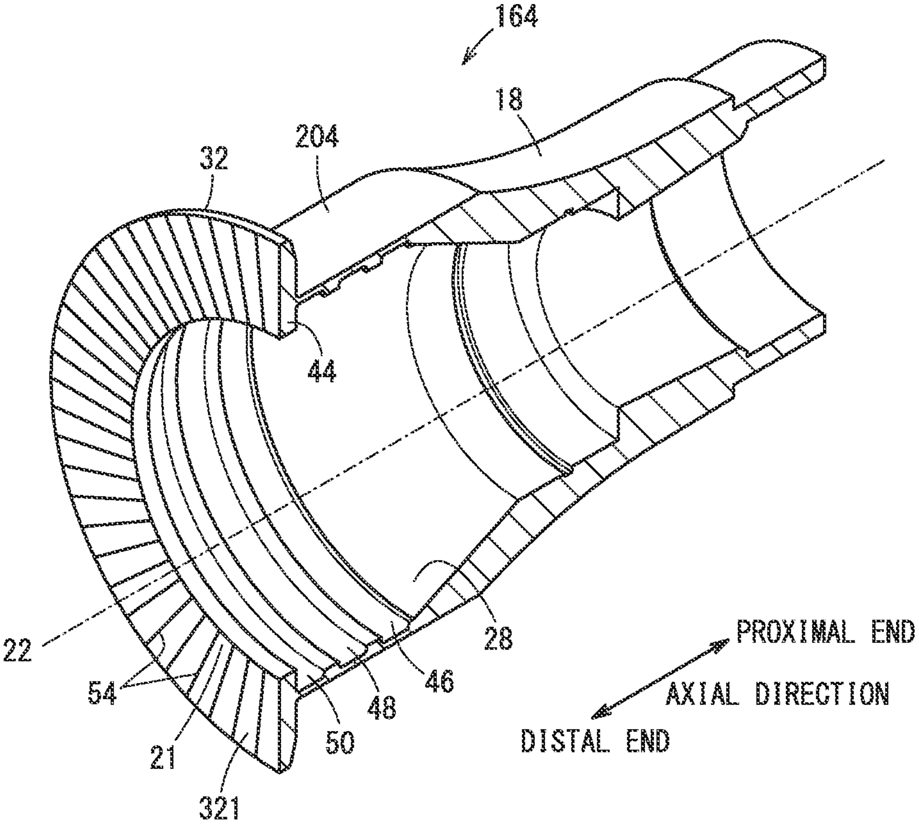
FIG. 10 is a perspective cross-sectional view of a bell cup according to a fifth embodiment.

As shown in FIG. 10, a bell cup 164 of the present embodiment differs from the bell cup 162 described with reference to FIG. 8 in a side surface portion 204. In the bell cup 164 in FIG. 10, the same components as those of the bell cup 162 described with reference to FIG. 8 are denoted by the same reference numerals, and detailed description thereof is omitted.

The bell cup 164 of the present embodiment has a distal end surface 21 perpendicular to the axial direction, at the distal end of the side surface portion 204. The distal end surface 21 forms the same surface as the distal end surface 321 of the outward protruding portion 32. The bell cup 164 has a plurality of second notched portions 54 at the distal end surfaces 21 and 321. Each second notched portion 54 is formed in a fine groove shape. The second notched portion 54 extends in a radial direction of the axis 22. The plurality of second notched portions 54 are arranged at minute intervals in the circumferential direction. The plurality of second notched portions 54 are radially arranged when viewed from the distal end of the bell cup 164. Each second notched portion 54 extends from the inner peripheral edge of the distal end surface 21 of the side surface portion 204 to the outer peripheral edge of the distal end surface 321 of the outward protruding portion 32. Each of the second notched portions 54 has a V-shaped cross-sectional shape similar to that of the first notched portion 52 shown in FIG. 9B.

When the coating material 90 reaches the distal end of the side surface portion 204, the coating material 90 flows toward the outer periphery along the distal end of the side surface portion 204 due to centrifugal force. The coating material 90 flowing on the distal end of the side surface portion 204 flows along the second notched portions 54 due to surface tension. The second notched portions 54 stabilize the particle diameter of the ejected coating material 90 by making the flow rate and shape of the coating material 90 constant. Therefore, the bell cup 164 improves the coating quality by making the particle size of the coating material 90 uniform.

The rotary atomizing coating device 10 described in the above embodiments has the following effects.

The rotary atomizing coating device 10 includes the main body 12 including the rotary drive unit 14, and the bell cup 16 attached to the rotary drive unit. The bell cup includes: the side surface portion 20 extending toward the distal end in the axial direction of the rotary drive unit; the through hole 26 configured to allow the inner surface 28 and the outer surface 30 of the side surface portion to communicate with each other and also configured to eject the coating material 90 therethrough; and the outward protruding portion 32 that is formed closer to the distal end in the axial direction than the through hole and protrudes more outward in the radial direction of the axis of the rotary drive unit than the side surface portion.

The rotary atomizing coating device 10 includes, at the distal end of the bell cup 16, the outward protruding portion 32 projecting outward. The circumferential speed in the outward protruding portion 32 is faster than that in the side surface portion 20 of the rotating bell cup 16, whereby a negative pressure is generated in the vicinity of the outward protruding portion 32. As a result, the outward protruding portion 32 generates an airflow toward the distal end in the vicinity of the bell cup 16, and causes particles of the coating material 90 to be ejected toward the distal end. Therefore, the rotary atomizing coating device 10 can eject the coating material 90 toward the distal end without using shaping air.

In the rotary atomizing coating device described above, the outward protruding portion may be formed at the edge portion of the distal end of the bell cup in the axial direction. Such a bell cup 16 can more effectively generate an airflow toward the distal end by having the outward protruding portion 32 at the edge of the distal end.

In the rotary atomizing coating device described above, the outward protruding portion may include the distal end surface 321 located at the distal end in the axial direction and the proximal end surface 322 located at the proximal end in the axial direction, and the proximal end (proximal end surface 322) may be inclined so as to become closer to the distal end surface 321 toward the outer periphery of the outward protruding portion 32. The proximal end surface 322 inclined in this manner can cause the coating material 90 to be more effectively ejected toward the distal end by more effectively generating an airflow directed toward the distal end of the bell cup 16.

In the rotary atomizing coating device, the proximal end surface may be inclined in a curved surface shape. The proximal end surface 322 inclined in such a curved surface shape can more effectively generate an airflow toward the distal end.

In the rotary atomizing coating device, the side surface portion includes the plurality of through holes. The plurality of through holes 26 can cause the particles of the coating material 90 to be stably ejected even when the flow rate of the coating material 90 is large.

In the rotary atomizing coating device, the plurality of through holes may be arranged in a staggered pattern in the side surface portion. The plurality of through holes 26 arranged in a staggered pattern prevent collision of particles of the ejected coating material 90 and enables uniform coating.

In the rotary atomizing coating device described above, the side surface portion may include the annular inward protruding portion 44 that is disposed closer to the distal end in the axial direction than the through hole and that protrudes from the inner surface toward the center of the axis 22. When the flow rate of the coating material 90 increases, the inward protruding portion 44 prevents the coating material 90 from being discharged from the distal end of the bell cup 161, thereby preventing the occurrence of uneven coating.

In the rotary atomizing coating device described above, the bell cup may include the groove-shaped first notched portion 52 formed at the distal end of the bell cup and at part of the inner surface that is located near the distal end, the first notched portion extending in the axial direction. The first notched portion 52 stabilizes the particle diameter of the coating material 90 ejected from the distal end by making the flow rate and shape of the coating material 90 flowing toward the distal end of the bell cup 163 constant. As a result, the first notched portion 52 prevents the occurrence of uneven coating and enables uniform coating.

In the rotary atomizing coating device described above, the bell cup may include the distal end surface 21 perpendicular to the rotation axis at the distal end, and the distal end surface may include the groove-shaped second notched portion 54 extending in the radial direction of the axis. The second notched portion 54 makes the flow rate and the shape of the coating material 90 flowing on the distal end surface 21 of the bell cup 164 uniform, thereby stabilizing the particle diameter of the ejected coating material 90. As a result, the second notched portion 54 prevents the occurrence of uneven coating and enables uniform coating.

The present invention is not limited to the above-described embodiments, and various configurations can be adopted without departing from the essence and gist of the present invention.

What is claimed is:

1. A rotary atomizing coating device comprising a main body including a rotary driver, and a bell cup attached to the rotary driver, wherein the bell cup comprises:

a side surface portion extending from a proximal end toward a distal end in an axial direction of the rotary driver having a cylindrical shape with a constant outer diameter; the bell cup generates an airflow from the proximal end to the distal end of the the side surface portion and generates an airflow directed outward in the radial direction of the side surface portion; the distal end of the side surface portion having a distal end surface of the side surface portion; the distal end surface extends in a direction perpendicular to the axial direction at distal end thereof; the distal end surface includes a groove-shaped second notched portion extending in the radial direction of the axis;

a plurality of through holes extending in a radial direction of the side surface portion to allow an inner surface and an outer surface of the side surface portion to communicate with each other, a coating material being ejected outward in an atomized form in the radial direction of the side surface portion through the through holes while flowing along the inner surface by centrifugal force; and an outward protrusion that is formed at an edge portion of a distal end of the bell cup in the axial direction, the edge portion being closer to the distal end in the axial direction than the through holes, the outward protrusion protruding more outward in a radial direction of an axis of the rotary driver than the side surface portion;

the outward protrusion includes a distal end surface, a proximal end surface, and an outer end surface, the distal end surface of the outward protrusion forms a same plane of the distal end surface of the side surface portion;

the side surface portion includes an annular inward protruding portion that is located at the distal end of the side surface portion; the annular inward protruding portion protrudes from the inner surface of the side surface portion toward a center of the main body.

2. The rotary atomizing coating device according to claim 1, wherein the outward protrusion includes a distal end surface located at a distal end thereof in the axial direction and a proximal end surface located at a proximal end thereof in the axial direction, and the proximal end is inclined so as to become closer to the distal end surface toward an outer periphery of the outward protrusion.

3. The rotary atomizing coating device according to claim 2, wherein the proximal end surface is inclined in a curved surface shape.

4. The rotary atomizing coating device according to claim 1, wherein in the side surface portion, the plurality of through holes are arranged in a staggered pattern.

5. The rotary atomizing coating device according to claim 1, wherein the bell cup includes a groove-shaped first notched portion formed at a distal end of the bell cup and at part of the inner surface that is located near the distal end, the first notched portion extending in the axial direction.

* * * * *